United States Patent [19]

Iwakiri et al.

[11] Patent Number: 4,552,947
[45] Date of Patent: Nov. 12, 1985

[54] HEAT-RESISTING AROMATIC POLYESTER AND PROCESS FOR PREPARING THE SAME

[75] Inventors: Hiroshi Iwakiri; Masahiro Asada; Kazuya Yonezawa, all of Kobe, Japan

[73] Assignee: Kanegafuchi Kagaku Kogyo Kabushiki Kaisha, Osaka, Japan

[21] Appl. No.: 484,848

[22] Filed: Apr. 14, 1983

[30] Foreign Application Priority Data

Apr. 19, 1982 [JP] Japan .................................. 57-66121

[51] Int. Cl.$^4$ ............................................. C08G 63/18
[52] U.S. Cl. ..................................... 528/126; 528/125; 528/128; 528/173; 528/179; 528/180; 528/181; 528/182; 528/191; 528/193; 528/194
[58] Field of Search ............... 528/190, 191, 193, 194, 528/125, 126, 128, 173, 179–182

[56] References Cited

U.S. PATENT DOCUMENTS

| | | | |
|---|---|---|---|
| 3,748,303 | 7/1973 | Becker et al. | 528/193 |
| 4,118,372 | 10/1978 | Schaefgen | 528/193 |
| 4,287,332 | 9/1981 | Jackson, Sr. et al. | 528/193 |
| 4,289,870 | 9/1981 | Donohue et al. | 528/193 |
| 4,330,668 | 5/1982 | Hideo et al. | 528/176 |
| 4,390,682 | 6/1983 | Kyo et al. | 528/193 |
| 4,426,511 | 1/1984 | Asada et al. | 528/193 |

*Primary Examiner*—Lester L. Lee
*Attorney, Agent, or Firm*—Antonelli, Terry & Wands

[57] ABSTRACT

An aromatic polyester having improved heat resistance, hydrolysis resistance and alkali resistance which comprises recurring units of the general formula:

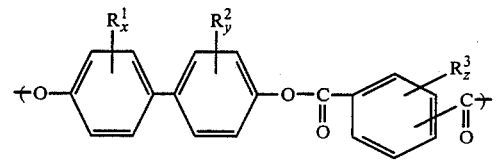

and recurring units of the general formula:

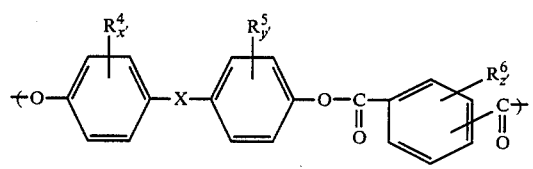

wherein $R^1$ and $R^2$ are an alkyl or alkoxyl group having 1 to 4 carbon atoms, $R^3$, $R^4$, $R^5$ and $R^6$ are the same or different and each is an alkyl or alkoxyl group having 1 to 4 carbon atoms, Cl or Br, x and y are an integer of 1 to 4, z, x', y' and z' are 0 or an integer of 1 to 4, and X is an alkylidene or cycloalkylidene group having 1 to 8 carbon atoms, —O—, —S—, —SO$_2$— or —CO—.

9 Claims, 6 Drawing Figures

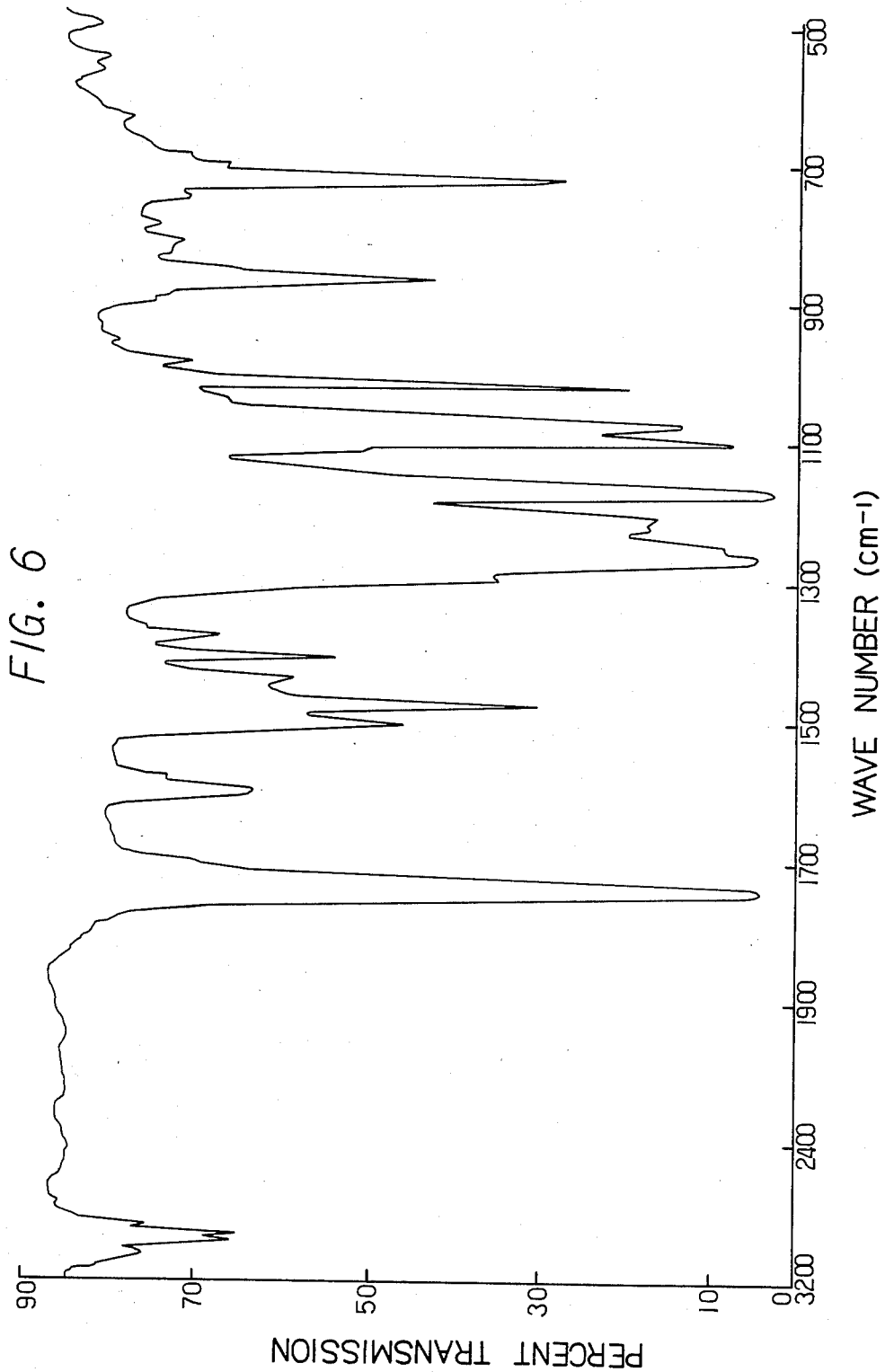

HEAT-RESISTING AROMATIC POLYESTER AND PROCESS FOR PREPARING THE SAME

BACKGROUND OF THE INVENTION

The present invention relates to a novel aromatic polyester resins having an improved heat resistance with improved water resistance and mechanical strength and a process for the preparation thereof.

Aromatic polyesters consisting of aromatic dicarboxylic acids and bivalent phenol compounds have been known for many years. Also, as processes for preparing them, an interfacial polycondensation process, a solution polymerization process, a melt polymerization process and so on have been known.

Aromatic polyesters have excellent heat resistance and mechanical property, and are useful substances as molding materials. In general, however, the aromatic polyesters have the property that the ester linkage is hydrolyzed, and particularly the alkali resistance is very poor. Further, although the aromatic polyesters have an excellent heat resistance, the heat resistance is not always satisfactory when the polyesters are used in the electric and electronic fields, and for instance, the heat resistance of the polyesters in molten solder is not sufficient. Therefore, it has been required to further raise the usable temperature region for the aromatic polyesters.

SUMMARY OF THE INVENTION

It has now been found that a polyester resin containing recurring units of the formula (I):

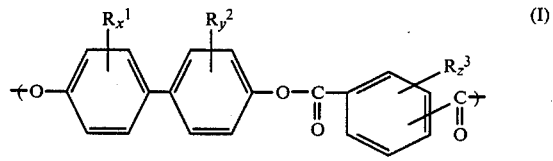

wherein $R^1$ and $R^2$ are an alkyl or alkoxyl group having 1 to 4 carbon atoms, $R^3$ is an alkyl or alkoxyl group having 1 to 4 carbon atoms, chlorine atom or bromine atom, x and y are an integer of 1 to 4, and z is 0 or an integer of 1 to 4, has not only an improved heat resistance, but also improved mechanical strength and hydrolysis resistance.

In accordance with the present invention, there is provided an aromatic polyester comprising (a) 1 to 99% by mole of units of the formula (I):

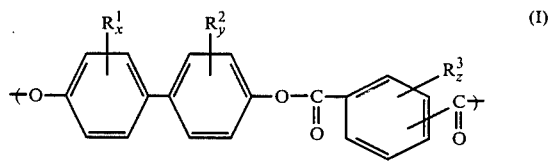

and (b) units of the formula (II):

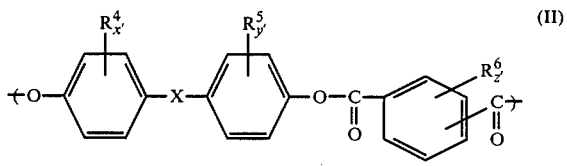

wherein $R^1$ and $R^2$ are an alkyl group having 1 to 4 carbon atoms or an alkoxyl group having 1 to 4 carbon atoms, $R^3$, $R^4$, $R^5$ and $R^6$ are the same or different and each is an alkyl group having 1 to 4 carbon atoms, an alkoxyl group having 1 to 4 carbon atoms, chlorine atom or bromine atom, x and y are an integer of 1 to 4, z, x', y' and z' are 0 or an integer of 1 to 4, and X is a bivalent group selected from the group consisting of an alkylidene group having 1 to 8 carbon atoms, a cycloalkylidene group having 1 to 8 carbon atoms, —O—, —S—, —SO₂— and —CO—.

BRIEF DESCRIPTION OF THE DRAWINGS

FIGS. 1 to 6 are infrared absorption spectrums of the aromatic polyesters of the present invention.

DETAILED DESCRIPTION

Figure 1:
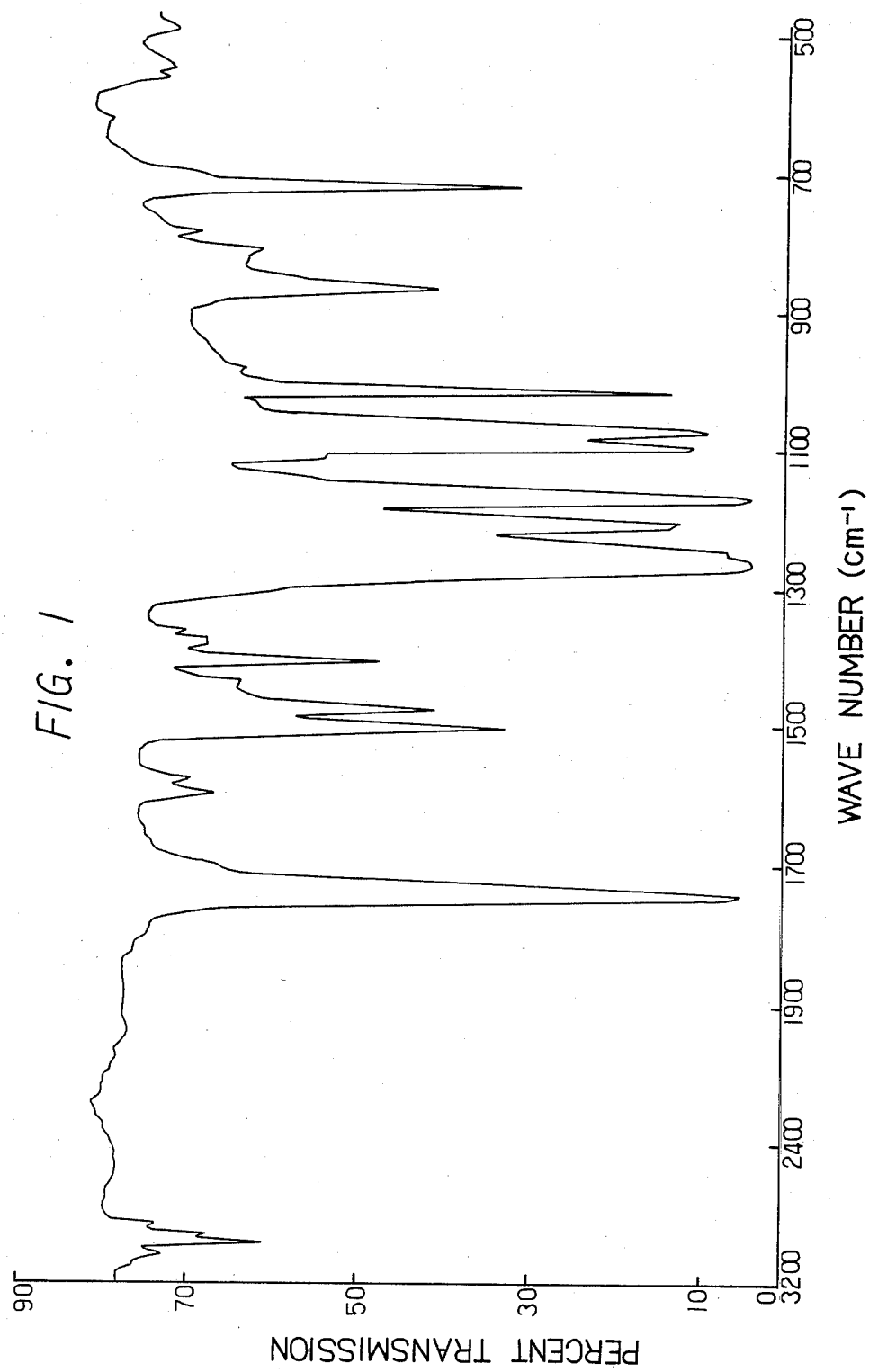

The aromatic polyesters of the present invention containing as an essential component 1 to 99% by mole of the units (I) have excellent heat resistance, mechanical strength and hydrolysis resistance.

Particularly, in case of the aromatic polyesters in which the units (I) are those having substituent groups at all of the 3 and 5 positions of the aromatic rings of the biphenol component, namely units of the formula (III):

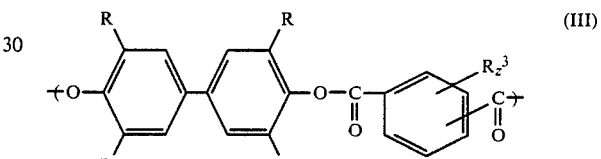

wherein R is an alkyl or alkoxyl group having 1 to 4 carbon atoms, and $R^3$ and z are as defined above, improvement of the hydrolysis resistance is remarkable.

Among them, the aromatic polyesters containing the units (III) in which R is methyl group, namely units of the formula (IV):

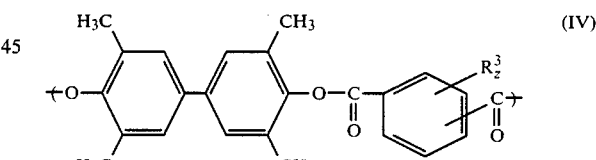

wherein $R^3$ and z are as defined above, are particularly excellent in hydrolysis resistance and alkali resistance, and are also advantageous in that the biphenol used as a raw material is easily obtainable.

The polyesters of the present invention have a high glass transition temperature (Tg) as shown in examples described after. For instance, the glass transition temperature of the polyesters of the present invention is higher than that of a commercially available polyester prepared by using 2,2-bis(4'-hydroxyphenyl)propane as a phenol component by 60° to 80° C. The glass transition temperature as shown herein is obtained from a logarithmic decrement measured by a dynamic viscoelasticity spectrometer.

The aromatic polyesters of the present invention are copolymers containing, in addition to the units (I) mentioned above, units of the following formula (II) in an arbitrary proportion within the range of 99 to 1% by mole:

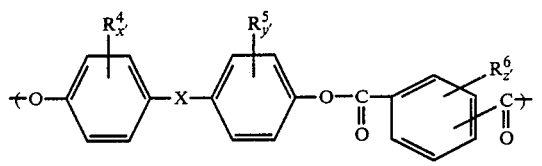

(II)

wherein $R^4$, $R^5$, $R^6$, x', y', z' and X are as defined above.

The polyesters of the present invention can contain as an essential component the units (I) in a proportion of 1 to 99% by mole. Polymers capable of being cast by a solution method can be obtained by suitably selecting the molar ratio of the units (I) to the units (II). From the viewpoint of the heat resistance, it is preferable that the polyesters contain at least 30% by mole of the units (I). Also, the water resistance and alkali resistance can be further improved by introducing the units (II) wherein the bisphenol component has alkyl or alkoxyl substituent groups at the 3 and 5 positions of the aromatic ring.

The hydrolysis resistance of the aromatic polyesters is remarkably improved by introducing alkyl or alkoxyl substituent groups at the 3 and 5 positions of the difunctional phenol component as compared with the use of nonsubstituted or halogen-substituted difunctional phenols.

In the present invention, the difunctional phenol to be reacted with the dicarboxylic acid dihalide is employed in the form of a mixture of a biphenol compound and a bisphenol compound.

As biphenol compounds, there are employed compounds of the following formula:

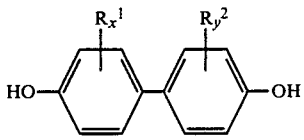

wherein $R^1$, $R^2$, x and y are as defined above. Preferable biphenol compounds are those having substituent groups at the 3 and 5 positions of the aromatic ring, namely compounds of the following formula:

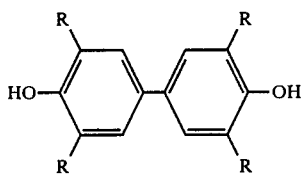

wherein R is as defined above.

Typical examples of the biphenol compound are 4,4'-dihydroxy-3,3',5,5'-tetramethylbiphenyl, 4,4'-dihydroxy-3,3',5,5'-tetraethylbiphenyl, 4,4'-dihydroxy-3,3',5,5'-tetramethoxybiphenyl, 4,4'-dihydroxy-3,3',5,5'-tetraethoxybiphenyl, and the like. The biphenol compounds may be employed alone or in admixture thereof.

The bisphenol compounds used in combination with the biphenol compounds in the present invention are compounds of the following formula:

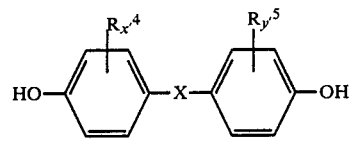

wherein $R^4$, $R^5$, x', y' and X are as defined above. Typical examples of the biphenol compound are bis(4-hydroxyphenyl)methane, bis(4-hydroxy-3-methylphenyl)-methane, bis(4-hydroxy-3,5-dimethylphenyl)methane, bis(4-hydroxy-3,5-dichlorophenyl)methane, bis(4-hydroxy-3,5-dibromophenyl)methane, bis(4-hydroxyphenyl)ketone, bis(4-hydroxyphenyl)sulfide, bis(4-hydroxyphenyl)sulfone, bis(4-hydroxy-3,5-dimethylphenyl)sulfone, 1,1-bis(4-hydroxyphenyl)ethane, 2,2-bis(4-hydroxyphenyl)propane, 2,2-bis(4-hydroxy-3-methylphenyl)propane, 2,2-bis(4-hydroxy-3,5-dimethylphenyl)propane, 2,2-bis(4-hydroxy-3,5-dichlorophenyl)propane, 2,2-bis(4-hydroxy-3,5-dibromophenyl)propane, 1,1-bis(4-hydroxyphenyl)cyclohexane, and the like. The bisphenol compounds may be employed alone or in admixture thereof.

Preferable dicarboxylic acid dihalides used in the present invention are terephthaloyl chloride, isophthaloyl chloride and a mixture thereof.

The difunctional phenol compound which is a mixture of the biphenol compound and the bisphenol compound is employed in substantially equimolar amounts with the dicarboxylic acid dihalide.

The aromatic polyesters of the present invention can be easily prepared by employing a phase transfer catalyst. That is to say, the aromatic polyesters are prepared by reacting an alkali metal salt of the difunctional phenol compound with the dicarboxylic acid dihalide in the presence of a phase transfer catalyst. For instance, a difunctional phenol compound is added to an aqueous solution of a hydroxide of an alkali metal such as potassium or sodium and is reacted with the alkali metal hydroxide to form an aqueous solution of an alkali metal salt of the difunctional phenol compound. To the aqueous solution of the alkali metal salt of the difunctional phenol compound is added a solution of a dicarboxylic acid dihalide in an organic solvent which is substantially immiscible with water, and they are reacted in the presence of a phase transfer catalyst. It is necessary that the alkali metal salt of the difunctional phenol compound contains at least 1% by mole of an alkali metal salt of the biphenol compound. The concentration of the aqueous solution of the alkali metal salt of the difunctional phenol compound is not particularly limited, and the aqueous solution of the alkali metal salt of the difunctional phenol compound can be employed in arbitrary concentrations.

In the polycondensation reaction using a phase transfer catalyst, an operation for removing a salt is unnecessary or easy, since water is used as one of the reaction solvents. Also, lowering of the reaction temperature and shortening of the reaction time can be attained as comparaed with conventional melt polymerization process and solution polymerization process. Further, it is possible to employ inexpensive general organic solvents.

It is preferable to employ organic solvents which are substantially immiscible with water. Typical examples of the organic solvent are halogenated hydrocarbons such as methylene chloride and chloroform, halogenated aromatic hydrocarbons such as o-dichlorobenzene, and aromatic hydrocarbons such as toluene and xylene. The organic solvents may be employed alone or in admixture thereof. Particularly, in case of employing terephthaloyl chloride and/or isophthaloyl chloride as dicarboxylic acid dihalides, it is convenient to employ them in the form of a solution in the above-mentioned organic solvents. Although the concentration of the organic solvent solution is not particularly limited, it is usually selected from 2 to 30% by weight.

Examples of the phase transfer catalyst used in the present invention are, for instance, quaternary ammonium salts such as trioctylmethylammonium chloride and benzyltributylammonium chloride, quaternary phosphonium salts such as tetrabutylphosphonium bromide and phenyltributylphosphonium bromide, and crown ethers such as 18-crown-6 and dicyclohexyl-18-crown-6. These catalysts are employed in an amount of 0.1 to 20% by mole, preferably 1 to 10% by mole, based on the total of the whole phenol compounds.

The polymerization reaction using the phase transfer catalyst is carried out at a temperature of 0° to 50° C. In general, the reaction for 1 to 5 hours is sufficient.

A monofunctional phenol compound such as p-t-butylphenol or p-methoxyphenol and a monofunctional acid chloride such as benzoyl chloride may be employed in order to adjust the molecular weight of the product. The use of large amounts of these monofunctional compounds results in large lowering of the molecular weight. Therefore, in case of employing these monofunctional compounds, they are preferably employed in an amount of not more than 10% by mole based on the difunctional compounds. When the molecular weight of the aromatic polyester is too low, the mechanical strength of films, sheets or other moldings prepared from the polyester becomes insufficient. Therefore, it is desirable that the intrinsic viscosity of the aromatic polyester is not less than 0.1 dl./g. (at 23° C. in a phenol/1,1,2,2-tetrachloroethane mixed solvent of 1/1 by weight), especially 0.1 to 8 dl./g., more especially from 0.3 to 3.0 dl./g.

The aromatic polyesters of the present invention contains the units (I) in the molecule, and are useful for production of various moldings. In particular, excellent heat resistance and water resistance are imparted by introducing of the units (I).

The film and sheet prepared from the aromatic polyesters of the present invention have excellent soldering resistance and electric characteristic. The film and sheet can be prepared by a known method such as casting or extrusion. The mechanical strength of the film and sheet is further improved by stretching them.

The present invention is more specifically described and explained by means of the following Examples. It is to be understood that the present invention is not limited to the Examples, and various changes and modifications may be made in the invention without departing from the spirit and scope thereof.

EXAMPLE 1

To 2.28 g. (10 millimoles) of 2,2-bis(4-hydroxyphenyl)propane (hereinafter referred to as "bisphenol A"), 2.46 g. (10 millimoles) of 4,4'-dihydroxy-3,3',5,5'-tetramethylbiphenyl (hereinafter referred to as "TM biphenyl") and 0.32 g. of sodium thiosulfate were added 10 ml. of a 5N aqueous solution of sodium hydroxide and 50 ml. of water in a nitrogen stream, and they were dissolved to form a uniform aqueous solution. In 100 ml. of methylene chloride were dissolved 4.26 g. (21 millimoles) of terephthaloyl dichloride and 0.16 g. of trioctylmethylammonium chloride. The methylene chloride solution was added to the aqueous solution at 0° C., and the reaction was carried out at 0° C. for 30 minutes. To the reaction mixture was added 1 ml. of benzoyl chloride, and the agitation was further continued at 0° C. for 10 minutes. The methylene chloride layer was washed with water 3 times, and was poured to an excess of acetone to precipitate a polymer. The polymer was filtered off and dried. The yield was 95%. The infrared absorption spectrum of the obtained polymer is shown in FIG. 1.

In 45 g. of a phenol-tetrachloroethane mixed solvent (1:1 by weight) was dissolved 5 g. of the polymer. The solution was cast on a glass plate, and the solvent was removed by heating at 100° C. for 30 minutes, at 150° C. for 30 minutes and then at 260° C. for 10 minutes to form a film having a thickness of 98 μm.

The results are shown in Table 1.

EXAMPLES 2 TO 6

Aromatic polyesters and films thereof were prepared in the same manner as in Example 1 except that the acid chloride and a mixture of the difunctional phenol compounds shown in Table 1 were employed.

The results are shown in Table 1.

COMPARATIVE EXAMPLE 1

An aromatic polyester and a film thereof were prepared in the same manner as in Example 1 except that only bisphenol A which had no substituent group at the position adjacent to the phenolic hydroxyl group, was employed in an amount of 4.56 g. (20 millimoles) as a phenol component and 21 millimoles of a mixture of terephthaloyl dichloride (hereinafter referred to as "TPC") and isophthaloyl dichloride (hereinafter referred to as "IPC") was employed as an acid component.

The results are shown in Table 1.

EXAMPLE 7

The procedure of Example 1 was repeated except that benzyltributylammonium chloride was employed as a phase transfer catalyst. The same polymer as obtained in Example 1 was obtained in a yield of 96%.

EXAMPLES 8 AND 9

The procedure of Example 1 was repeated except that tetrabutylphosphonium bromide or dicyclohexyl-18-crown-6 was employed in an amount of 1% by mole based on the total of the whole phenol compounds to give the same polymer as obtained in Example 1. The yields were 95% and 92%, respectively.

TABLE 1

| | Phenol compound[1] | | Acid chloride[2] | | Yield (%) | $T_g$[3] (°C.) | Intrinsic viscosity[4] (dl./g.) |
|---|---|---|---|---|---|---|---|
| | Kind | Amount (millimole) | Kind | Amount (millimole) | | | |
| Ex. 1 | Bisphenol A | 10 | TPC | 21 | 98 | 312 | 1.86 |
| | TM biphenyl | 10 | | | | | |

TABLE 1-continued

| | | | | | | | |
|---|---|---|---|---|---|---|---|
| Ex. 2 | Bisphenol A | 14 | TPC | 21 | 100 | 310 | 2.03 |
| | TM bisphenyl | 6 | | | | | |
| Ex. 3 | TM bisphenyl | 10 | TPC | 21 | 97 | 304 | 2.18 |
| | TM bis-F | 10 | | | | | |
| Ex. 4 | TM bisphenyl | 6 | TPC | 21 | 98 | 310 | 2.82 |
| | TM bis-F | 14 | | | | | |
| Ex. 5 | TM bisphenyl | 12 | TPC | 21 | 100 | 322 | 1.51 |
| | Bisphenol A | 4 | | | | | |
| | TM bis-F | 4 | | | | | |
| Ex. 6 | TM bisphenyl | 15 | $\frac{TPC}{IPC} = \frac{3}{1}$ | 21 | 98 | 310 | 1.34 |
| | Bisphenol A | 5 | | | | | |
| Com. Ex. 1 | Bisphenol A | 20 | $\frac{TPC}{IPC} = \frac{1}{1}$ | 21 | 92 | 242 | 1.14 |

Figure 2:
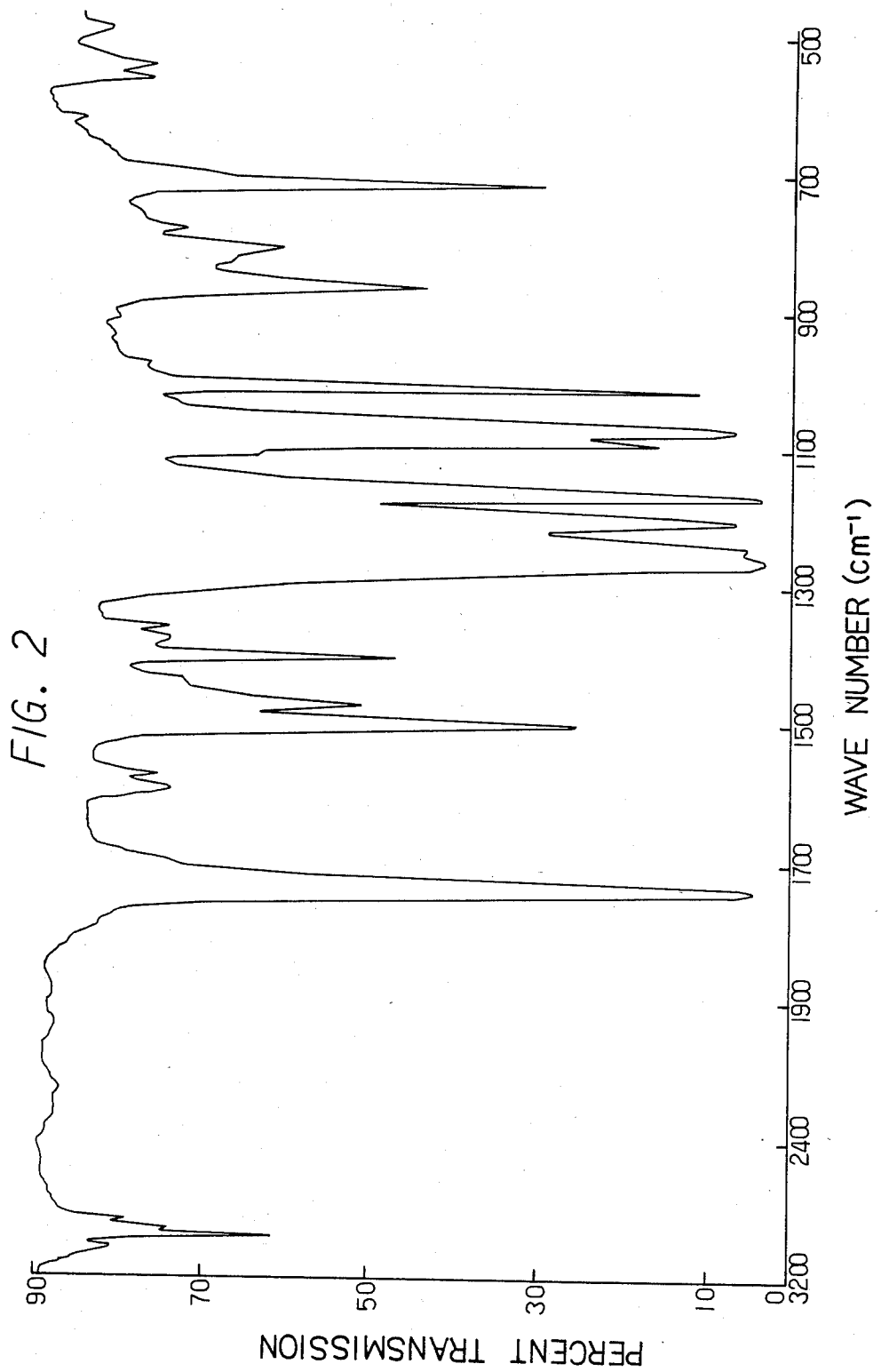
Figure 3:
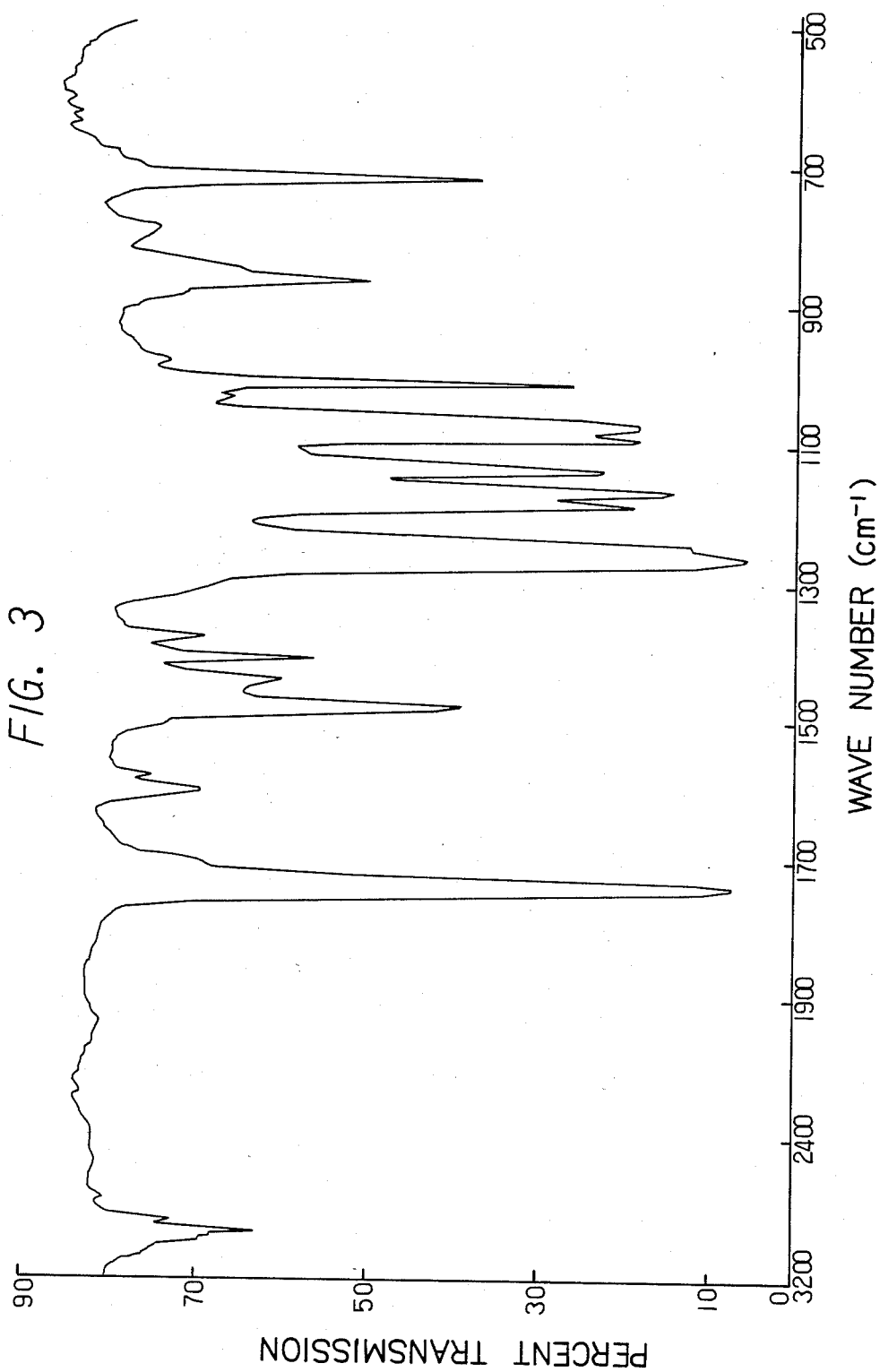
Figure 4:
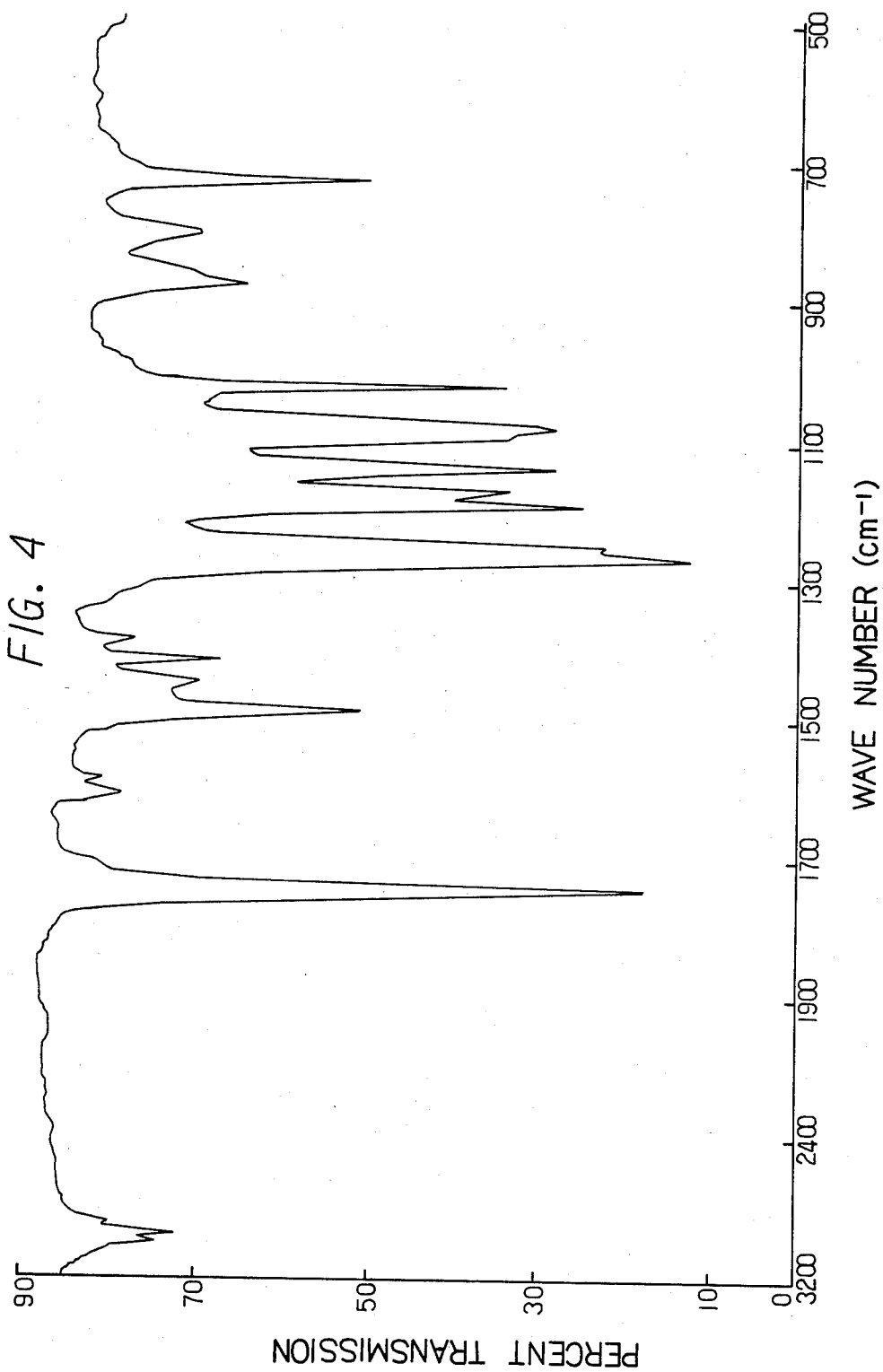
Figure 5:
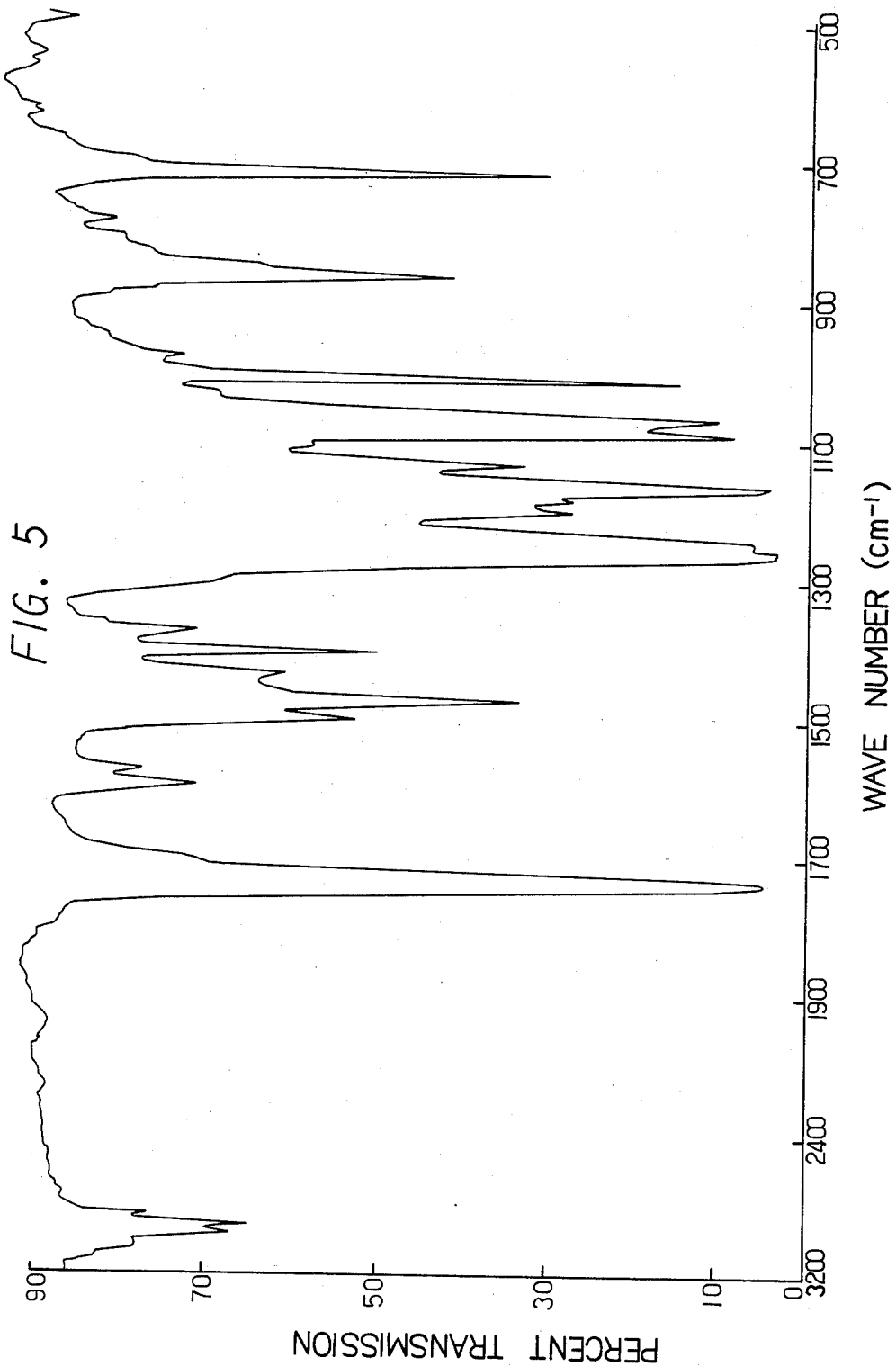

| | | | Properties of film | | | |
|---|---|---|---|---|---|---|
| | Tensile strength (kg./cm.$^2$) | Elongation (%) | Water resistance[5] (Rate of weight decrease, %) | Alkali resistance[6] (Rate of weight decrease, %) | IR spectrum | of film (μm.) |
| Ex. 1 | 1125 | 25 | 0 | 24 | FIG. 1 | 98 |
| Ex. 2 | 1030 | 25 | 1.1 | 36 | FIG. 2 | 86 |
| Ex. 3 | 1129 | 15 | 0.7 | 5.5 | FIG. 3 | 106 |
| Ex. 4 | 1098 | 15 | 0.1 | 6 | FIG. 4 | 110 |
| Ex. 5 | 1126 | 18 | 0.2 | 8 | FIG. 5 | 103 |
| Ex. 6 | 1059 | 23 | 3.2 | 8.5 | FIG. 6 | 103 |
| Com. Ex. 1 | 665 | 16 | 3.5 | 44 | — | 101 |

(Notes)

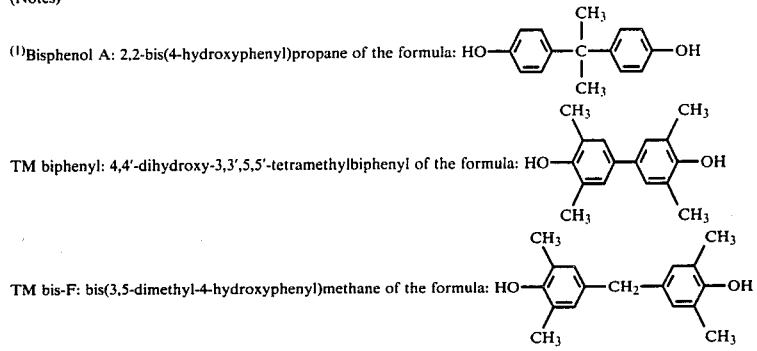

[1] Bisphenol A: 2,2-bis(4-hydroxyphenyl)propane of the formula:

TM biphenyl: 4,4'-dihydroxy-3,3',5,5'-tetramethylbiphenyl of the formula:

TM bis-F: bis(3,5-dimethyl-4-hydroxyphenyl)methane of the formula:

[2] TPC: terephthaloyl dichloride
IPC: isophthaloyl dichloride
[3] The glass transition temperature (Tg) was obtained from logarithmic decrement measured by a dynamic viscoelasticity spectrometer made by RHESCA CO.
[4] The intrinsic viscosity of a polymer was measured at 23° C. with respect to a solution in a mixed solvent of phenol and 1,1,2,2-tetrachloroethane (1:1 by weight).
[5] The water resistance was estimated by a rate of weight decrease in immersing in boiling water for 25 hours.
[6] The alkali resistance was estimated by a rate of weight decrease in immersing in a 10% by weight aqueous solution of sodium hydroxide at 100° C. for 10 hours.

In addition to the ingredients used in the Examples, other ingredients can be used in the Examples as set forth in the specification to obtain substantially the same results.

What we claim is:

1. An aromatic polyester comprising (a) 30 to 99% by mole of units of the formula (I):

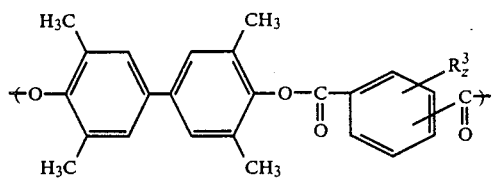

and (b) units of the formula (II):

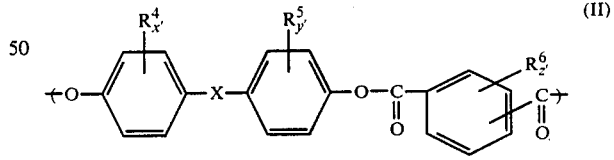

wherein $R^3$, $R^4$, $R^5$ and $R^6$ are the same or different and each is an alkyl group having 1 to 4 carbon atoms, an alkoxyl group having 1 to 4 carbon atoms, chlorine atom or bromine atom, z, x', y' and z' are 0 or an integer of 1 to 4, and X is a bivalent group selected from the group consisting of an alkylidene group having 1 to 8 carbon atoms, a cycloalkylidene group having 1 to 8 carbon atoms, —O—, —S—, —SO$_2$— and —CO—.

2. The aromatic polyester of claim 1, wherein the intrinsic viscosity of the aromatic polyester is from 0.1 to 8 dl./g.

3. A process for preparing a heat-resisting aromatic polyester which comprises reacting a mixture of alkali metal salts of difunctional phenol compounds containing at least 1% by mole of an alkali metal salt of 4,4'-dihydroxy-3,3',5,5'-tetramethylbiphenyl with terephthaloyl chloride, isophthaloyl chloride or a mixture thereof in the presence of a phase transfer catalyst.

4. The process of claim 3, wherein said mixture contains at least 30% by mole of an alkali metal salt of 4,4'-dihydroxy-3,3',5,5'-tetramethylbiphenyl.

5. The process of claim 3, wherein said difunctional phenol compounds are employed in the form of an aqueous solution prepared by dissolving the compounds in an aqueous solution of potassium or sodium hydroxide.

6. The process of claim 3, wherein said phase transfer catalyst is a member selected from the group consisting of quaternary ammonium salts, quaternary phosphonium salts and crown ethers.

7. A film or sheet of an aromatic polyester comprising (a) 30 to 99% by mole of units of the formula (I):

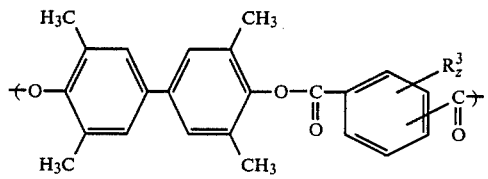

and (b) units of the formula (II):

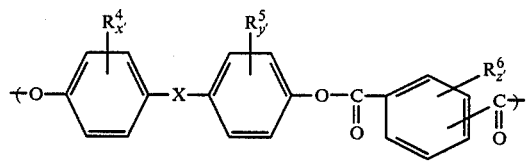

wherein $R^3$, $R^4$, $R_5$, and $R^6$ are the same or different and each is an alkyl group having 1 to 4 carbon atoms, an alkoxyl group having 1 to 4 carbon atoms, chlorine atom or bromine atom, z, x', y' and z' are 0 or an integer of 1 to 4, and X is a bivalent group selected from the group consisting of an alkylidene group having 1 to 8 carbon atoms, a cycloalkylidene group having 1 to 8 carbon atoms, —O—, —S—, —SO$_2$— and —C—.

8. The aromatic polyester of claim 1, wherein $R^4$ and $R^5$ are the alkyl group or the alkoxy group and are attached to all 3 and 5 positions of each aromatic ring.

9. An aromatic polyester comprising (a) 30 to 99% by mole of units of the general formula:

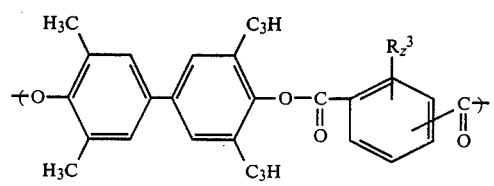

and (b) units of the general formula:

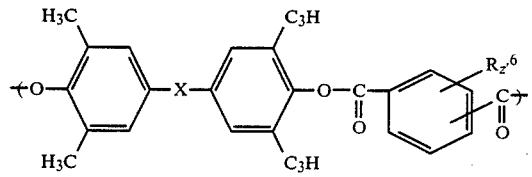

wherein $R^3$ and $R^6$ are the same or different and each is an alkyl group having 1 to 4 carbon atoms, an alkoxyl group having 1 to 4 carbon atoms, chlorine atom or bromine atom, z and z' are 0 or an integer of 1 to 4, and X is a bivalent group selected from the group consisting of an alkylidene group having 1 to 8 carbon atoms, a cycloalkylidene group having 1 to 8 carbon atoms, —O—, —S—, —SO$_2$— and —CO—.

* * * * *